J. P. ANDERSON.
Mill for Grating Cocoanuts, &c.

No. 163,434.
Patented May 18, 1875.

Witnesses,
Harry Smith
Hubert Howson

John P. Anderson
by his Attorneys,
Howson and Son

UNITED STATES PATENT OFFICE.

JOHN P. ANDERSON, OF PHILADELPHIA, PENNSYLVANIA.

IMPROVEMENT IN MILLS FOR GRATING COCOA-NUTS.

Specification forming part of Letters Patent No. 163,434, dated May 18, 1875; application filed April 5, 1875.

*To all whom it may concern:*

Be it known that I, JOHN P. ANDERSON, of Philadelphia, Pennsylvania, have invented certain Improvements in Mills for Grating Cocoa-Nut and other substances, of which the following is a specification:

The object of my invention is the construction of a simple and efficient machine for grating cocoa-nut and other analogous substances; and this object I attain in the manner which I will now proceed to describe, reference being had to the accompanying drawing, in which—

Figure 1:
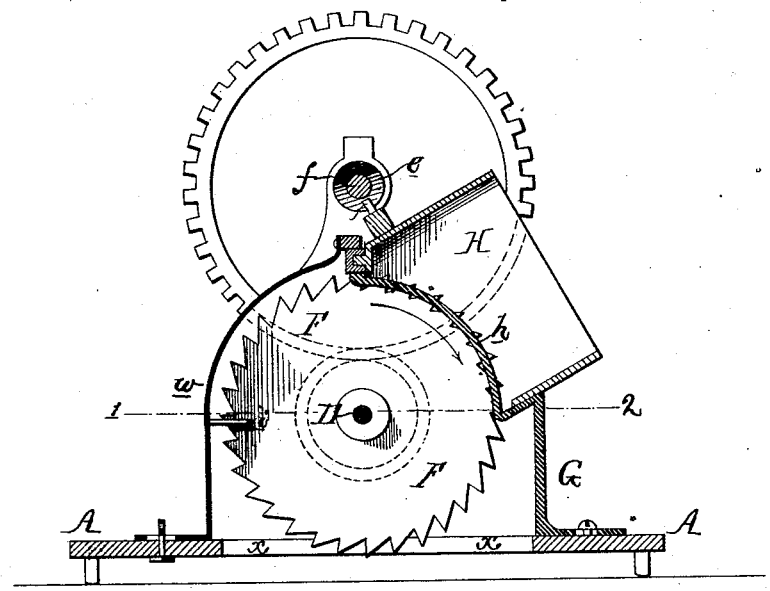
Figure 2:
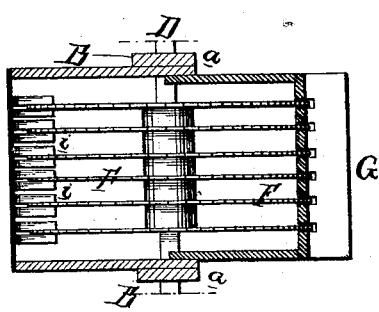
Figure 3:
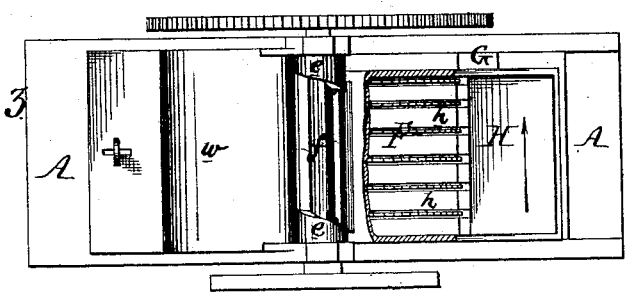

Figure 1 is a vertical section of my improved grating-machine; Fig. 2, a sectional plan on the line 1 2; and Fig. 3 a plan view.

A is the base of the machine, to which are secured two plates or standards, B B', each having a suitable bearing, $a$, for the main shaft D, and to this shaft are secured a number of circular saws, F, arranged at short distances apart from each other. In front of the machine, and to the base A, is secured a shield, G, a portion, $h$, of which is made segmental and concentric, or nearly so, with the saws, the points of the teeth of which projects through slots made in the said segmental portion $h$ of the shield. It is these projecting points of the teeth which perform the duty of grating the cocoa-nut or other material contained in the hopper H, which serves as a guide for and retainer of the material while the latter is being forced against the teeth, the segmental portion of the shield preventing the teeth from making too deep a cut in the material. A more effectual grating of the material, however, is accomplished by imparting to the hopper a lateral motion, and this is brought about by making the hopper reciprocate transversely. The hopper is adapted to transverse guides on the shield, and is actuated, in the present instance, by scroll-cams $e$, on a shaft, $f$, which may be the driving-shaft of the machine, and may be geared to the main shaft D, the cams bearing against projections on the hopper and causing the same to reciprocate. The shield G is made adjustable to and from the main shaft, so that more or less of the teeth of the saws may project through the slots according to the depth of the cut required. The circular saws are inclosed partly by the standards B B', partly by the plate $w$ at the rear, and partly by the shield in front, the grated material falling through an opening, $x$, in the base of the machine into any suitable receptacle. A slotted stripper-plate, $i$, is secured to the rear of the casing, a part of each saw projecting into one of the slots, so that the material adhering to the blades of the saws may be cleared therefrom.

I claim as my invention—

1. The combination in a grating-machine of a series of circular saws, with a slotted segmental shield, substantially as and for the purpose described.

2. The combination of the series of circular saws, and the slotted segmental shield, with a reciprocating hopper, H.

3. The combination in a grating-machine of the circular saws, hopper H, shaft $f$, and scroll-cams $e$, whereby a reciprocating movement is imparted to the hopper.

4. The adjustable shield G and its slotted plate $h$, in combination with the saws, as set forth.

5. The combination of the saws with the slotted stripper-plate $i$.

In testimony whereof I have signed my name to this specification in the presence of two subscribing witnesses.

J. P. ANDERSON.

Witnesses:
HUBERT HOWSON,
HARRY SMITH.